(12) United States Patent
Le Moing et al.

(10) Patent No.: US 10,633,089 B2
(45) Date of Patent: Apr. 28, 2020

(54) MOTORIZED DEVICE WITH RECIPROCATING MOTION OF A LOCOMOTION MEMBER AND ASSOCIATED CONTROL METHOD

(71) Applicant: OFFICE NATIONAL D'ETUDES ET DE RECHERCHES AÉROSPATIALES, Palaiseau (FR)

(72) Inventors: Thierry Le Moing, Saint Orens de Gameville (FR); Mathieu Rognant, Calmont (FR)

(73) Assignee: OFFICE NATIONAL D'ÉTUDES ET DE RECHERCHES AÉROSPATIALES, Palaiseau (FR)

( * ) Notice: Subject to any disclaimer, the term of this patent is extended or adjusted under 35 U.S.C. 154(b) by 270 days.

(21) Appl. No.: 15/575,777

(22) PCT Filed: May 11, 2016

(86) PCT No.: PCT/FR2016/051103
§ 371 (c)(1),
(2) Date: Nov. 20, 2017

(87) PCT Pub. No.: WO2016/185114
PCT Pub. Date: Nov. 24, 2016

(65) Prior Publication Data
US 2018/0155020 A1 Jun. 7, 2018

(30) Foreign Application Priority Data
May 19, 2015 (FR) ..................................... 15 54473

(51) Int. Cl.
*B64C 33/02* (2006.01)
*A63H 27/00* (2006.01)
(Continued)

(52) U.S. Cl.
CPC ............. *B64C 33/02* (2013.01); *A63H 27/12* (2013.01); *A63H 29/22* (2013.01); *B64C 39/024* (2013.01);
(Continued)

(58) Field of Classification Search
CPC ....... B64C 33/00; B64C 33/02; B64C 33/025; A63H 27/12; A63H 29/22
See application file for complete search history.

(56) References Cited

U.S. PATENT DOCUMENTS

2002/0117583 A1 8/2002 Hamamoto et al.
2004/0195436 A1 10/2004 Sinclair
(Continued)

FOREIGN PATENT DOCUMENTS

| JP | 2006-142913 A | 6/2006 |
|----|---------------|--------|
| JP | 2008-001269 A | 1/2008 |
| JP | 2009-178592 A | 8/2009 |

OTHER PUBLICATIONS

International Search Report for PCT Patent App. No. PCT/FR2016/051103 (dated Aug. 19, 2016) with English translation thereof.
(Continued)

*Primary Examiner* — Assres H Woldemaryam
*Assistant Examiner* — Aaron M Rodziwicz
(74) *Attorney, Agent, or Firm* — Kenealy Vaidya LLP

(57) ABSTRACT

A motorized device capable of moving in a fluid and including one or more locomotor systems, each having at least one drive assembly linked to at least one locomotion member and a motor controlled by a voltage. The frequency of a reciprocating motion of the drive assembly matches the resonant frequency of the locomotion member linked to a non-movable portion by at least one prestrained elastic member. The instantaneous amplitude of the reciprocating motion of the drive assembly is adjusted to control the average position and the maximum amplitude of the reciprocating motion of the locomotion member. The drive assembly includes at least one speed reducer for reducing the speed of rotation of the motor. When the motor is operating at its maximum mechanical power, the speed of rotation transmitted to the at least one locomotion member is reduced to match the resonance frequency.

20 Claims, 2 Drawing Sheets

(51) Int. Cl.
    *A63H 29/22*     (2006.01)
    *H02P 23/16*     (2016.01)
    *B64C 39/02*     (2006.01)
    *H02K 7/075*     (2006.01)
    *H02K 7/116*     (2006.01)
    *H02K 19/02*     (2006.01)

(52) U.S. Cl.
    CPC ............ *H02K 7/075* (2013.01); *H02K 7/116* (2013.01); *H02K 19/02* (2013.01); *H02P 23/16* (2016.02); *B64C 2201/025* (2013.01)

(56) References Cited

U.S. PATENT DOCUMENTS

| | | | | |
|---|---|---|---|---|
| 2012/0248243 | A1* | 10/2012 | Greenyer | B64C 33/02 244/72 |
| 2012/0292438 | A1* | 11/2012 | Sreetharan | B64C 33/02 244/72 |
| 2013/0320133 | A1* | 12/2013 | Ratti | B64C 33/02 244/22 |
| 2014/0061379 | A1* | 3/2014 | Campolo | B64C 39/028 244/72 |
| 2014/0158821 | A1* | 6/2014 | Keennon | B64C 33/02 244/72 |
| 2014/0162524 | A1 | 6/2014 | Van Ruymbeke | |
| 2016/0185455 | A1* | 6/2016 | Deng | B60L 1/00 310/38 |

OTHER PUBLICATIONS

International Preliminary Report on Patentability for PCT Patent App. No. PCT/FR2016/051103 (dated Aug. 17, 2017).

\* cited by examiner

MOTORIZED DEVICE WITH RECIPROCATING MOTION OF A LOCOMOTION MEMBER AND ASSOCIATED CONTROL METHOD

CROSS REFERENCE TO RELATED APPLICATION(S)

This application is a national phase filing under 35 C.F.R. § 371 of and claims priority to PCT Patent Application No. PCT/FR2016/051103, filed on May 11, 2016, which claims the priority benefit under 35 U.S.C. § 119 of French Patent Application No. 1554473, filed on May 19, 2015, the contents of each of which are hereby incorporated in their entireties by reference.

BACKGROUND

Some embodiments relate to drones, and particularly to micro-drones with beating wings that are capable of stationary flight and of actuation mechanisms allowing these stationary flights.

Related art micro-drones with beating wings exist. For many of them, actuation mechanisms have been developed for the purpose of allowing stationary flight.

In particular, micro-drones flying by using resonating mechanisms that actuate a pair of beating wings of this micro-drone have been proposed. These mechanisms use two DC motors each having a rotor axis to which one of the wings is directly attached. For each motor, a coil spring is linked on one side to a wing and on the other to the body of the motor. Each motor is underpowered so as to beat the wings at the resonant frequency of the mechanical system driven by this motor, in particular the wing and the spring that are linked to this motor.

The advantage of such a mechanism is that it allows the pitch and the roll to be controlled simply by controlling the amplitude of the beating motion. This therefore allows the number of actuators to be decreased in comparison with systems that use the deformation and the specific orientation of the wings to control the pitch and the roll.

In addition, by virtue of the resonance of the system, this mechanism makes it possible to avoid the energy expenditure desired in this embodiment to reverse the angular speed of the wing, the inertia of which is non-negligible. All or most of the power delivered by the motor can thus be used to compensate for the damping of the motion due to aerodynamic forces.

SUMMARY

However, in these mechanisms, only 10% of the maximum power of the motor employed may be used. Especially when beating the wings, the useful mechanical power of the motor at this point in operation is equal to around 10% of the maximum power of this motor when it is supplied with the electrical power for which it was designed.

This type of mechanism is thus unsuitable for high-amplitude beating. Specifically, in order to obtain motion of this type using motors operating at 10% of their maximum power, it may be necessary to have recourse to motors of large size, which would thus have a severely negative impact on the maneuverability of the drones including them, or would even be oversized with respect to the size of the drone.

Some embodiments therefore provide devices capable of moving in a fluid medium by using a reciprocating motion of beating members and which are simple to produce and highly maneuverable.

To this end, one embodiment is a motorized device capable of moving in a fluid medium, this device including one or more locomotor systems, the or each of the locomotor systems including a portion referred to as the non-movable portion and a movable portion that is capable of carrying out at least one reciprocating motion with respect to the non-movable portion and is linked to the non-movable portion by means of at least one elastic member, the movable portion including at least one drive assembly that is linked to at least one motor of the one or more locomotor systems and at least one locomotion member that is linked to at least one drive assembly such that a reciprocating motion of the drive assembly drives a reciprocating motion of the locomotion member. In this device:

the at least one elastic member is prestrained, the level of prestrain being sufficient such that the strain on the elastic member does not change sign during the reciprocating motion of the movable portion;

the at least one motor is controlled by a voltage, the voltage being such that, on the one hand, the frequency of the reciprocating motion of the drive assembly is substantially equal to the resonant frequency of the movable portion that is linked to the non-movable portion by the at least one elastic member and, on the other hand, the instantaneous amplitude of the reciprocating motion of the drive assembly is adjusted so as to control the average position and the maximum amplitude of the reciprocating motion of the at least one locomotion member;

the drive assembly includes at least one speed reducer for reducing the speed of rotation of the at least one motor, the reducer being designed so that when the motor is operating at its maximum mechanical power, the speed of rotation transmitted to the at least one locomotion member is reduced with respect to the speed of rotation of the motor so as to match the speed of rotation conferring a frequency corresponding to the resonant frequency to the reciprocating motion of the at least one locomotion member.

Thus, since this device is a resonating system, it retains the advantages thereof, namely that it uses all or most of the power delivered by the motor to compensate for the damping of the motion due to the frictional forces of the fluid. In addition, it makes it possible to enhance or optimize the use of the power that the motor is capable of delivering. In particular, by virtue of the reducer, the speed of rotation at the reducer is decreased in comparison with the speed of rotation of the motor, and as such the reducer, and hence the drive assembly, transmits a lower angular speed to the locomotion member. Consequently, for a given amplitude, the reciprocating motion transmitted to the locomotion member by the drive assembly is at a lower frequency than if the locomotion member were driven directly by the motor. Thus, this reducer makes it possible for the frequency of the reciprocating motion of the drive assembly transmitted to the locomotion member to match the resonant frequency of the movable portion without decreasing the speed of rotation directly at the output of the motor. As such, it is no longer desired in this embodiment to underpower this motor. Thus the reducer is arranged so that when the motor is running at its maximum mechanical power, the reciprocating motion of the drive assembly reaches the resonant frequency of the movable portion. Consequently, this device is driven by a resonating system that is also powerful.

In particular, it is possible to use motors of small size, which nonetheless would have the power required to allow devices, in particular drones, of a few tens of centimeters in size to fly. These devices could have high acceleration capabilities.

In addition, the reciprocating motion of the locomotion members will have a maximum amplitude that will be able to be set by controlling the voltage. In this way, it is possible to adjust the lift of the device. In particular, the maximum amplitude of the reciprocating motion may be set to a value that is sufficient to allow the device to be sustained in the fluid, for example a stationary flight in the air, while staying at the resonant frequency of the system.

In addition, the voltage also makes it possible to control the average position of the reciprocating motion of the at least one locomotion member. In so doing, it makes it possible to control the average position of the reciprocating motion of the locomotion member so that it is toward the front, in the middle or toward the rear of the motorized device. It therefore makes it possible to control the pitch of the motorized device.

Using a single actuator, it is therefore possible to adjust the lift and the pitch of the motorized device.

The instantaneous amplitude is defined as the position at a given instant in time with respect to the average position during a reciprocating motion, for example of the locomotion member, or as the value of the voltage at a given instant in time. The maximum amplitude is defined as the absolute value of the position of the locomotion member that is furthest away from the average position of the reciprocating motion, or as the maximum absolute value of the voltage.

Some embodiments may optionally have one or more of the following features:
- the device can include two locomotor systems, the motorized device including control means for sending and adjusting the voltages independently of one another for each of the locomotor systems, so that these voltages are such that the instantaneous amplitude of the reciprocating motion of the drive assembly of each of the locomotor systems may be adjusted independently, so as to control the average position and the maximum amplitude of the reciprocating motion of an at least one locomotion member of one of the locomotor systems independently of the average position and the maximum amplitude of the reciprocating motion of an at least one locomotion member of the other of the locomotor systems; in this way the motorized device can be controlled with respect to its roll axis;
- the voltage is a sinusoidal voltage, the frequency of which corresponds to the resonant frequency of the movable portion that is linked to the non-movable portion by the at least one elastic member; this allows a reciprocating motion of the locomotion members to be produced efficiently, the parameters of which members are easily controlled by modifying those of this voltage, in particular its frequency, its maximum amplitude and its mean amplitude;
- each locomotor system includes two elastic members that are arranged so that when the locomotion member moves in one direction during its reciprocating motion, the strain on one of the elastic members increases and the strain on the other decreases, and vice versa when the locomotion member moves in the other direction during its reciprocating motion; this allows a buildup of potential energy, that of the elastic element on which the strain increases, in both directions of the reciprocating motion;
- in the case of the option of the preceding paragraph, for each locomotor system one of the elastic members is arranged above the reducer and the other elastic member is arranged below the reducer, the motor of the corresponding locomotor system being arranged below the reducer;
- for each locomotor system, the two elastic members are arranged above the reducer, the motor of the corresponding locomotor system being arranged below the reducer; thus, by having the elastic members on one side of the reducer and the motor on the other, there is advantageously more space for the motor, thus making it possible to have a larger motor;
- the one or more elastic members are coil springs, in particular non-contiguous coil springs; coil springs are simple and effective members for producing a resonating system; in addition, the coil spring may be arranged between the movable portion and the non-movable portion so as usually to be under torsional strain, its torsion increasing or decreasing according to the direction of the reciprocating motion; coil springs are in this case particularly suitable for the presently disclosed subject matter; in addition, when the turns are non-contiguous, there is less dissipation through friction and the service life of the springs is increased;
- the one or more motors are coreless electric motors; they offer very substantial acceleration capabilities and a service life that is longer than that of conventional DC motors due to the absence of a metal core and the resulting low inductances; in addition, these motors are compact; these motors may in particular be used in embodiments in which, as described above, the elastic members are positioned above and below the reducer;
- in the case of these coreless motors, the voltage may be controlled by means of switched-mode control, in particular using an H-bridge for each motor;
- instead of being coreless motors, the one or more motors are brushless electric motors; these motors are provided with a plurality of pairs of poles, which make it possible to deliver high torque at low speed; in addition, these motors may be used in the motorized device with a reducer of lower ratio, which is advantageous for decreasing size and mechanical losses; these motors may in particular be used in embodiments in which, as described above, the elastic members of the one or more locomotor systems are positioned above the corresponding reducer;
- in the case of one or more brushless motors, each motorized system includes position sensors for detecting the position of the rotor of the motor of the corresponding motorized system and a control module for adjusting the voltage according to this position; this allows the one or more motors to operate more efficiently;
- the reducer is a single-stage speed reducer; this allows a design that is advantageous for decreasing size and mechanical losses;
- the size of the motorized device is comprised between 15 and 25 cm and/or the weight thereof is comprised between 15 and 30 grams; these motorized devices are particularly suitable for movement in a confined environment; the motorized device according to some embodiments is particularly suitable for such sizes and weights;

the reducer is arranged so that when the motor is operating at its maximum mechanical power, at the resonant frequency, the maximum amplitude is comprised between 50 and 80 degrees with respect to the average position of the locomotion member; such an amplitude is particularly suitable for stationary flight; the motorized device according to some embodiments is particularly suitable for such amplitudes.

Other embodiments are directed to a method for controlling a motorized device capable of moving in a fluid medium, the device including one or more locomotor systems, the or each of the locomotor systems including a portion referred to as the non-movable portion and a movable portion that is capable of carrying out at least one reciprocating motion with respect to the non-movable portion and is linked to the non-movable portion by member of at least one elastic member, the movable portion including at least one drive assembly that is linked to at least one motor of the one or more the locomotor systems and at least one locomotion member that is linked to at least one drive assembly such that a reciprocating motion of the assembly drives a reciprocating motion of the locomotion member. This method also has the following features:

it includes a control of the motor that does not change the sign of the strain on the elastic member during the reciprocating motion of the movable portion;

the control of at least one motor being achieved by means of a voltage such that, on the one hand, the frequency of the reciprocating motion of the drive assembly is substantially equal to the resonant frequency of the movable portion that is linked to the non-movable portion by the at least one elastic member and, on the other hand, the instantaneous amplitude of the reciprocating motion of the drive assembly is adjusted so as to control the average position and the maximum amplitude of the reciprocating motion of the at least one locomotion member;

the speed of rotation of at least one motor, when it is operating at its maximum mechanical power, being transmitted, by a reducer included within the drive assembly, to the at least one locomotion member so that the speed of rotation of the latter matches the speed of rotation conferring a frequency corresponding to the resonant frequency to the reciprocating motion of the at least one locomotion member.

The method will confer the same advantages on the motorized device as described above for the first subject of some embodiments.

This method is in particular a method for controlling a motorized device according to some embodiments.

The control method according to some embodiments may optionally have one or more of the following features:

it includes at least one of the following steps:
increasing or decreasing the maximum amplitude of the voltage, such that the lift of the motorized device is increased or decreased, respectively;
modulating the mean value of the voltage, such that the motorized device pitches forward or backward or otherwise remain stable;
the device includes two locomotor systems, the electrical commands for controlling the at least one motor of each locomotor system being produced independently for each of the locomotor systems, so that these voltages are such that the instantaneous amplitude of the reciprocating motion of the drive assembly of each of the motorized systems is adjusted independently, so as to control the average position and the maximum amplitude of the reciprocating motion of an at least one locomotion member of one of the locomotor systems independently of the average position and the maximum amplitude of the reciprocating motion of an at least one locomotion member of the other of the locomotor systems;

it includes at least the step of independently modulating the maximum amplitude of each of the motors of the locomotor systems such that the motorized device exhibits a motion of rolling to the right or to the left.

In the motorized device and in the method according to some embodiments, the locomotion member may be a wing and the fluid may be the air. In this case the motorized device is a flying object.

However, some embodiments may also be applied to a swimming motorized device, the locomotion member being a fin and the fluid a liquid, such as water. The swimming motorized device may include only one locomotor system, for example in the case of a drone reproducing the motion of the caudal fin of a fish or the tail flukes of a marine mammal.

BRIEF DESCRIPTION OF THE FIGURES

Other features and advantages of some embodiments will become apparent upon reading the detailed description of the following non-limiting examples, to aid in the understanding of which reference will be made to the appended drawings, in which.

DETAILED DESCRIPTION OF EXEMPLARY EMBODIMENTS

Figure 1:
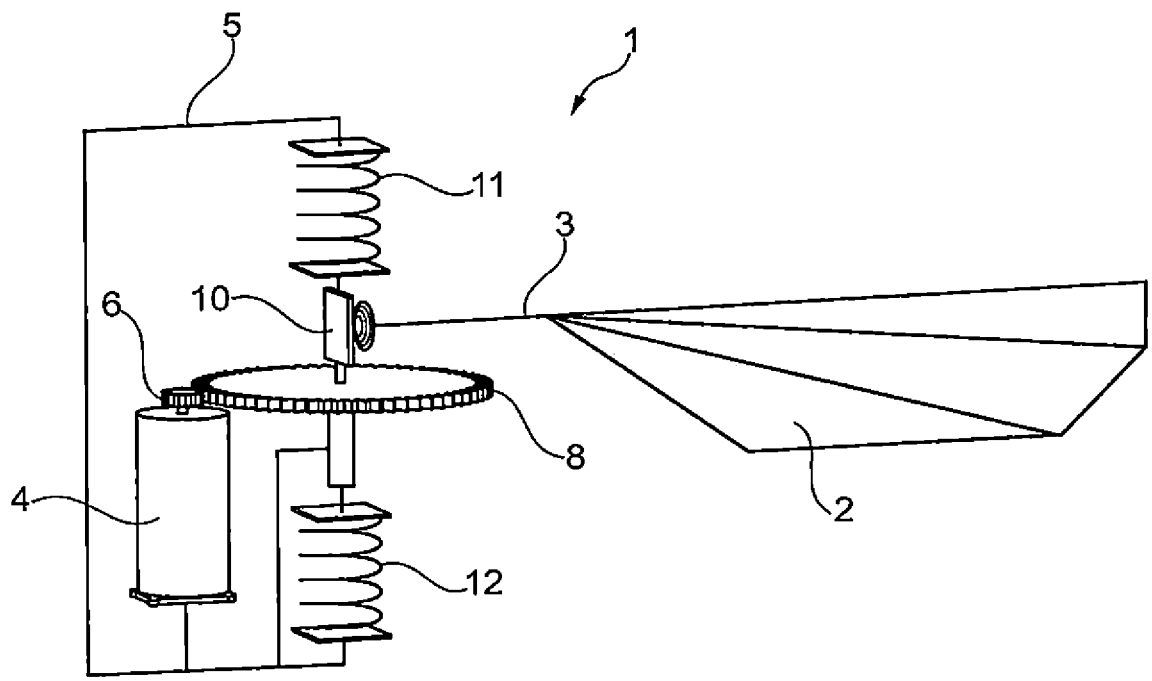
FIG. 1 is a perspective view showing a locomotor system of a motorized device according to a first embodiment.

According to a first embodiment, the motorized device is a flying micro-drone, moving through the air by beating two wings forming the two locomotion members. In FIG. 1, only one locomotor system 1 is illustrated. The drone includes a second one that is symmetrical to that which is illustrated.

Each locomotor system includes a non-movable portion formed by the chassis of the micro-drone. The chassis is schematically shown here by the line denoted by 5. The chassis 5 is, in this example, shared with the locomotor system that is not shown. An electric motor 4, including a rotor and a stator (both not shown), is mounted in this chassis. The rotor of this motor indirectly rotates an assembly of elements forming a portion that is movable with respect to the chassis 5.

This movable portion includes the wing 2 and a part 10 for retaining the wing. A command (not shown) to the locomotor system 1 sets the rotor of the motor 4 in a reciprocating motion. Consequently, the motor 4 makes the wings 2 beat.

The motor 4 may for example be a motor that is conventionally used for applications relating to small or most models.

According to some embodiments, the motor 4 drives the wing 2, via a drive assembly including a speed reducer. The latter is for example a single-stage speed reducer, formed by a pinion 6 and a toothed gear 8, the diameter of which is larger than that of the pinion 6. The pinion 6 is rotated directly by the rotor. The toothed gear 8 meshes with the pinion 6, and their axes of rotation are parallel.

The retaining part 10 is arranged above the toothed gear 8, the axis of rotation of the latter passing through this retaining part 10. The retaining part 10 is attached to the toothed gear 8 and is therefore rotated about the axis of rotation of the latter.

The wing 2 includes a shaft, a reed 3 in this example, in particular a carbon reed 3, forming the leading edge of the wing. The membrane of the wing 2 extends along the greatest portion of this reed 3. This reed 3 is attached to the retaining part 10, transversally to the axis of rotation of the toothed gear 8, in particular perpendicularly, so that the axis of rotation of the toothed gear 8 is also that of the wing 2. The latter is therefore set in a reciprocating motion, corresponding to this wing 2 beating.

An elastic member links the movable portion to the chassis 5 via a first torsion spring 11 with non-contiguous turns, attached in this example to the retaining part 10. Another elastic member, in particular a second torsion spring 12 with non-contiguous turns, may also be added, as illustrated in FIG. 1.

In this example, the retaining part 10 and the first elastic member 11 are located above the reducer, and in particular above the toothed gear 8. The second spring 12 is below the reducer, in particular below the toothed gear 8. In particular, the second spring 12 is fastened on one side to the toothed gear and on the other to the chassis 5.

Each of the springs 11, 12 is mounted under strain so that this strain never or rarely changes sign. For example, the springs are aligned on the axis of rotation of the toothed gear 8 and attached to the chassis 5 after a quarter-turn rotation so that they remain loaded in the direction of closure of the turns throughout one beating cycle.

They are in particular arranged on either side of the reducer so that when the toothed gear 8 increases the torsion on the first spring 11, the second spring 12 releases the energy that it had accumulated previously and its torsional strain decreases. During this phase of reciprocating motion, the strain on the second spring 12 does not cross a zero value. When the motion changes direction, the strain on the second spring 12 is increased, pushed by the motor and by the release of the energy accumulated by the first spring 11.

The use of two prestrained springs 11, 12 makes it possible to exert a torsional preload in the equilibrium position of the wing 2, and subsequently to keep the springs loaded in the direction of closure throughout one beating period. This allows the mechanical resistance properties of the springs to be retained over a longer period.

The assembly of the springs 11 and 12 and the wing 2 form a resonating system having its own resonant frequency. According to some embodiments, the motor 4 is controlled so that the frequency of the reciprocating motion of the pinion 6 is identical to this resonant frequency.

The speed reducer 6, 8 allows the motor 4 to be set to its maximum power, at which the motor regime operates most efficiently and with the most power, and hence at a high speed of rotation, while having wing 2 beats that are at the frequency corresponding to the resonant frequency. Without this reducer 6, 8, the frequency of the wing 2 beats would be above the resonant frequency.

The nominal speed of rotation of the standard electric micro-motors used is often by design usually much higher than the maximum instantaneous speed resulting from the beating motion of a wing. The reduction ratio is therefore determined so as to be able to have the maximum mechanical power at the effective value of the speed of rotation resulting from the beating motion.

In order to control this reciprocating motion in the case of a coreless motor, the supply voltage of the motor is controlled so as to modulate it into a sinusoidal voltage. The instantaneous amplitude thus corresponds to the instantaneous amplitude of the reciprocating motion of the wing 2. Controlling the maximum amplitude and the mean value of this voltage will allow the micro-drone to be controlled, as will be explained below.

In this example, the motor 4 is a coreless motor. Its rotor contains no iron, having a mass of 2.6 grams (g) and a diameter of 7 millimeters (mm). Its no-load speed of rotation is close to 40,000 revolutions per minute (rpm), which is well above that which is desired in this embodiment to reach the resonant frequency of the movable portion. The motor 4 is supplied with a DC supply voltage of 3.7 V. The voltage is for example generated by means of switched-mode control electronics including an H-bridge for each of the motors 4.

The ratio of the reducer formed by the pinion 6 and the toothed gear 8 is 8/70. This high-ratio reducer makes it possible to offset the axis of the wing 2 from the rotor of the motor 4, taking the size of the toothed gear 8 into account. It thus becomes easier to position the springs 11 and 12 above and below the reducer.

The springs may have an external diameter of between 4 and 6, in particular 5 mm. This small diameter contributes to a small increase in the inertia of the movable elements, and consequently to a small decrease in the resonant frequency of the mechanical system.

The length of the wing 2 is 75 mm and a diameter of the carbon reed is 1 mm. The membrane of the wing is cut from a polyester film having a thickness of 60 μm. This example of locomotor systems 1 allows the beating of the wings of the micro-drone to be sustained at a frequency of 28 hertz (Hz) with maximum amplitudes reaching +/−75°, with a supply voltage of 3.7 volts (V).

Despite its low mass, the coreless motor 4 delivers significant power. Besides its very substantial acceleration capabilities, it offers a service life that is longer than that of conventional DC motors due to the absence of a metal core and the resulting low inductances.

The internal stator of a coreless motor can include or can consist of just one pair of poles, which leads to high speeds of rotation. Consequently, this makes them advantageous for applications in drones of small size that may require relatively high beating frequencies, such as that illustrated.

Figure 2:
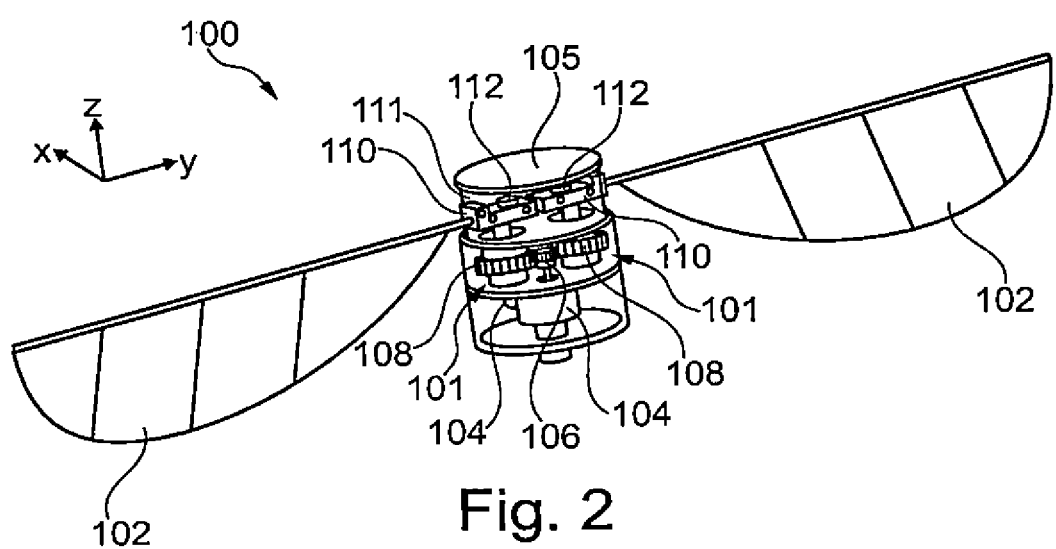
FIG. 2 is a perspective view showing a motorized device according to a second embodiment.
Figure 3:
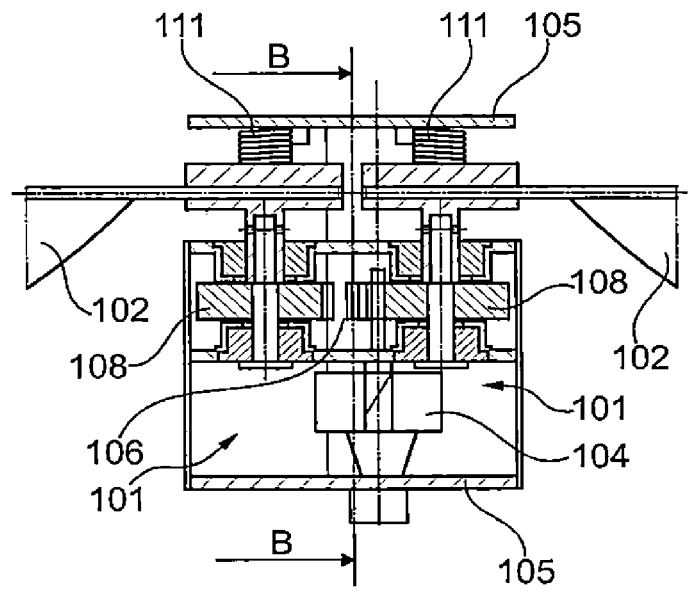
FIG. 3 is a cross-sectional view of FIG. 2 in a vertical plane passing through the pivoting axes of the locomotion members.
Figure 4:
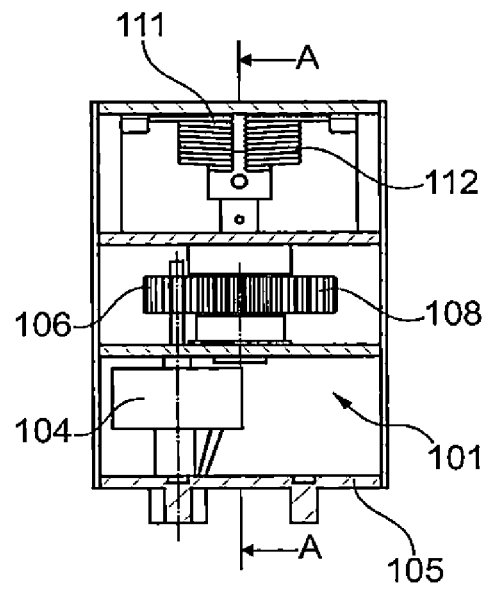
FIG. 4 is a cross-sectional view of FIG. 3 along BB.

A second embodiment is illustrated in FIGS. 2 to 4. This is also a flying micro-drone 100, moving through the air by beating two wings 102. In FIGS. 2 and 3, both locomotor systems 101 can be seen, while only one can be seen in FIG. 4. It differs from the preceding embodiment in the following features.

In this embodiment, the first spring 111 and the second spring 112 are two symmetrical torsion springs that are positioned above the reducer, which is formed by the toothed gear 108 and the pinion 106. The two springs 111 and 112 are positioned side-by-side above the retaining part 110 for retaining the corresponding wing 102, on either side of the axis of rotation of the retaining part 110 for retaining the wing 102. The absence of springs positioned below the reducer 6, 8 makes it possible to use a motor requiring a lower reduction ratio.

The springs 111 and 112 are attached under prestrain on one side to this retaining part 110 and to the chassis 105, so that in the equilibrium position of the wing, these two springs are preloaded, in particular by a quarter turn, in two opposite directions.

Each of the locomotor systems 101 includes a brushless motor 104 with an external rotor, having a diameter of 10 mm in this example.

Brushless micro-motors are provided with a plurality of pairs of poles, which allows them to deliver high torque at low speed. Consequently, these motors may be used in the proposed mechanism with a reducer of lower ratio, which is advantageous for decreasing size and mechanical losses.

In this example, the reducer 106, 108 has a speed reduction ratio of 12/48, i.e. lower than that in the first embodiment.

The brushless motors 104 may be synchronous permanent-magnet three-phase motors. The locomotor system 101 includes control electronics designed to allow a periodic change in the direction of rotation. The control electronics may in particular include sensors that make it possible to determine the position of the rotor at a given instant in time.

The inertia of the magnet-bearing external rotor and the use of a reducer results in the movable elements having a non-negligible inertia, which makes this type of motor 104 more advantageous for micro-drones 100 of larger size that may require beating frequencies that are lower than in the first embodiment.

Figure 5:
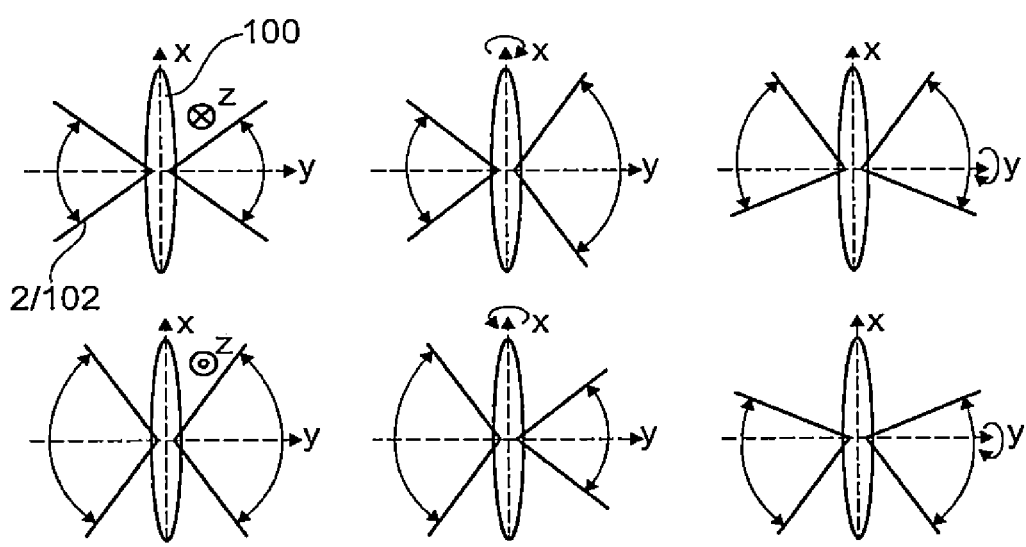
FIG. 5 illustrates positions of the locomotion members when the motorized device according to the first or the second embodiment of the motorized device is being controlled.

The micro-drones of the first and second embodiments are controlled by a method using the control of the sinusoidal voltage. Basic motions resulting from the use of this method are illustrated in FIG. 5.

The control of the reciprocating motion of the motor 4 or 104 is achieved by supplying power in the form of a sinusoidal voltage. The frequency of this voltage is adjusted so that its value approaches the resonant frequency of the mechanical system, thus controlling the resonating system in a forced regime.

Adjusting the instantaneous amplitude of the sinusoidal voltage applied to the motor 4 or 104 makes it possible to control the instantaneous amplitude of the beating of the wing of the corresponding locomotor system 1 or 101 without modifying the beating frequency, unlike in the case of rod-crank systems. On the left in FIG. 5, the maximum amplitude of the voltage has been increased between the upper drawing and the lower drawing, which has resulted in an increase in the maximum amplitude of the beating of the wing about the average position of the motion. The lift of the micro-drone is thus increased.

The voltages sent to the motors 4 or 104 of the two locomotor systems 1 or 101 are in phase and are equal in terms of maximum amplitude and mean value. Each wing 2 or 102 therefore beats with the same maximum amplitude and with the same average position. The micro-drone therefore exhibits no pitch angle or roll angle. In order to pitch the micro-drone forward or backward, the control method makes it possible to introduce a DC component that shifts the mean value of this sinusoidal voltage, allowing the average position of the wing 2 or 102 to be moved forward or backward while it is beating. This is the case on the right in FIG. 5, where, in the upper drawing, the introduction of a positive component causes the average position of the wings 2, 102 to shift forward and hence causes the drone to pitch backward, while in the lower drawing the introduction of a negative component causes the drone to pitch forward.

A roll moment is obtained, as illustrated by the middle drawings in FIG. 5, by supplying the motors of the locomotor systems with voltages that are synchronized at the same frequency, having the same mean value, but with different maximum amplitudes. Thus, the maximum beating amplitudes are no longer symmetrical and hence produce a roll torque. Consequently, it is possible to confer a leftward motion (upper middle drawing) or rightward motion (lower middle drawing) on the micro-drone.

The invention claimed is:

1. A motorized device moving in a fluid medium, the device comprising:
    at least one locomotor system, each of the at least one locomotor system including a motor, a locomotion member, a drive assembly, a non-movable portion and a movable portion that is carrying out at least one reciprocating motion with respect to the non-movable portion and the movable portion is linked to the non-movable portion by at least one elastic member, the movable portion including at least one drive assembly that is linked to the motor and the locomotion member that is linked to the drive assembly such that a reciprocating motion of the assembly drives a reciprocating motion of the locomotion member, wherein:
    the at least one elastic member is prestrained, the level of prestrain being sufficient such that the strain on the at least one elastic member does not change a sign during the reciprocating motion of the movable portion;
    the motor is controlled by a sinusoidal voltage, a frequency of which corresponds to a resonant frequency of the movable portion that is linked to the non-movable portion by the at least one elastic member so that the frequency of the reciprocating motion of the drive assembly is equal to the resonant frequency of the movable portion that is linked to the non-movable portion by the at least one elastic member and an instantaneous amplitude of the reciprocating motion of the drive assembly is adjusted so as to control an average position and a maximum amplitude of the reciprocating motion of the locomotion member; and
    the drive assembly includes at least one speed reducer to reduce the speed of rotation of the motor, the reducer being configured so that when the motor is operating at its maximum mechanical power, the speed of rotation transmitted to the locomotion member is reduced with respect to the speed of rotation of the motor so as to match the speed of rotation conferring a frequency corresponding to the resonant frequency to the reciprocating motion of the locomotion member.

2. The device as claimed in claim 1, wherein the device includes two locomotor systems, the motorized device including a controller for sending and adjusting the voltages independently of one another for each of the locomotor systems, so that these voltages are such that the instantaneous amplitude of the reciprocating motion of the drive assembly of one of the locomotor systems is adjusted independently of that of the other of the locomotor systems, so as to control the average position and the maximum amplitude of the reciprocating motion of the locomotion member of one of the locomotor systems independently of the average position and the maximum amplitude of the reciprocating motion of the locomotion member of the other of the locomotor systems.

3. The device as claimed in claim 2, wherein the at least one elastic member is a spring with non-contiguous turns.

4. The device as claimed in claim 2, wherein the motor is a coreless electric motor.

5. The device as claimed in claim 2, wherein the motor is a brushless electric motor.

6. The device as claimed in claim 2, wherein the at least one speed reducer is a single-stage speed reducer.

7. The device as claimed in claim 1, wherein each locomotor system includes two elastic members that are arranged so that when the locomotion member moves in one direction during its reciprocating motion, the strain on one of the two elastic members increases and the strain on the other decreases, and vice versa when the locomotion member moves in the other direction during its reciprocating motion.

8. The device as claimed in claim 7, wherein the at least one elastic member is a spring with non-contiguous turns.

9. The device as claimed in claim 7, wherein the motor is a coreless electric motor.

10. The device as claimed in claim 7, wherein the motor is a brushless electric motor.

11. The device as claimed in claim 7, wherein the at least one speed reducer is a single-stage speed reducer.

12. The device as claimed in claim 1, wherein the at least one elastic member is a spring with non-contiguous turns.

13. The device as claimed in claim 12, wherein the motor is a coreless electric motor.

14. The device as claimed in claim 12, wherein the motor is a brushless electric motor.

15. The device as claimed in claim 12, wherein the at least one speed reducer is a single-stage speed reducer.

16. The device as claimed in claim 1, wherein the motor is a coreless electric motor.

17. The device as claimed in claim 1, wherein the motor is a brushless electric motor.

18. The device as claimed in claim 1, wherein the at least one speed reducer is a single-stage speed reducer.

19. The device as claimed in claim 1, wherein the size of the motorized device is comprised between 15 and 25 cm and/or the weight thereof is comprised between 15 and 30 grams.

20. A method for controlling a motorized device moving in a fluid medium, the device including at least one locomotor system, each of the at least one locomotor system including a motor, a locomotion member, a drive assembly, a non-movable portion and a movable portion carrying out at least one reciprocating motion with respect to the non-movable portion and the movable portion is linked to the non-movable portion by at least one elastic member, the movable portion including at least one drive assembly that is linked to the motor and the locomotion member that is linked to the drive assembly such that a reciprocating motion of the assembly drives a reciprocating motion of the locomotion member, the method comprising:
  controlling the motor so as to not change the sign of the strain on the at least one elastic member during the reciprocating motion of the movable portion;
  controlling the motor by a sinusoidal voltage, a frequency of which corresponds to a resonant frequency of the movable portion that is linked to the non-movable portion by the at least one elastic member so that the frequency of the reciprocating motion of the drive assembly is substantially equal to the resonant frequency of the movable portion that is linked to the non-movable portion by the at least one elastic member and an instantaneous amplitude of the reciprocating motion of the drive assembly is adjusted so as to control an average position and a maximum amplitude of the reciprocating motion of the locomotion member; and
  transmitting the speed of rotation of the at least one motor, when the motor is operating at a maximum mechanical power, by a reducer comprised within the drive assembly, to the locomotion member so that the speed of rotation of the locomotion member matches the speed of rotation conferring a frequency corresponding to the resonant frequency to the reciprocating motion of the locomotion member.

\* \* \* \* \*